(12) United States Patent
Bonella et al.

(10) Patent No.: US 6,658,509 B1
(45) Date of Patent: Dec. 2, 2003

(54) MULTI-TIER POINT-TO-POINT RING MEMORY INTERFACE

(75) Inventors: Randy M. Bonella, Portland, OR (US); John B. Halbert, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 397 days.

(21) Appl. No.: 09/678,638

(22) Filed: Oct. 3, 2000

(51) Int. Cl.[7] .......................... G06F 13/00; G01R 31/08
(52) U.S. Cl. ..................... 710/100; 710/300; 370/223
(58) Field of Search ................................. 710/100, 300; 370/223, 88

(56) References Cited

U.S. PATENT DOCUMENTS 4,587,651 A * 5/1986 Nelson et al. ................ 370/88
4,821,174 A * 4/1989 Webb et al. .................. 710/107
6,400,682 B1 * 6/2002 Regula ......................... 370/223

* cited by examiner

*Primary Examiner*—Tim Vo
(74) *Attorney, Agent, or Firm*—Marger Johnson & McCollom, PC

(57) ABSTRACT

Methods and apparatus for a memory system using a ring memory bus architecture are disclosed. In one embodiment, a primary memory controller maintains point-to-point bus connections with each of two memory modules; the two modules maintain a third point-to-point bus connection between themselves, such that the three connections together form a ring bus. When data is sent from the controller to a module, half of the data is sent to the module in one direction along the ring and half is sent in the other direction, through the other module. Reverse bus communications from the module to the controller follow the reverse of these paths. This allows the bus to be half the width as it would otherwise be.

In an alternate embodiment, each module contains two banks of memory that are arranged in a second ring bus local to the module. This can double the density of devices mounted on a module, while reducing pin count and simplifying signal routing on the module.

36 Claims, 10 Drawing Sheets

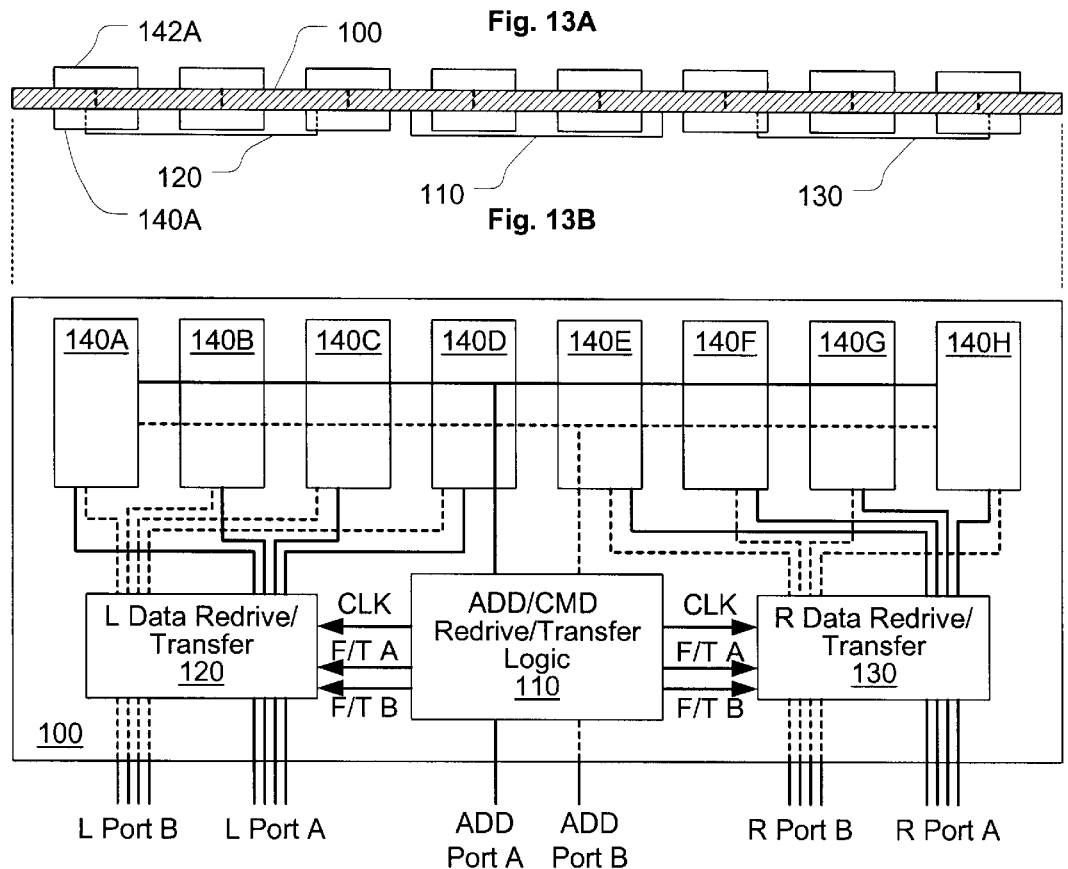
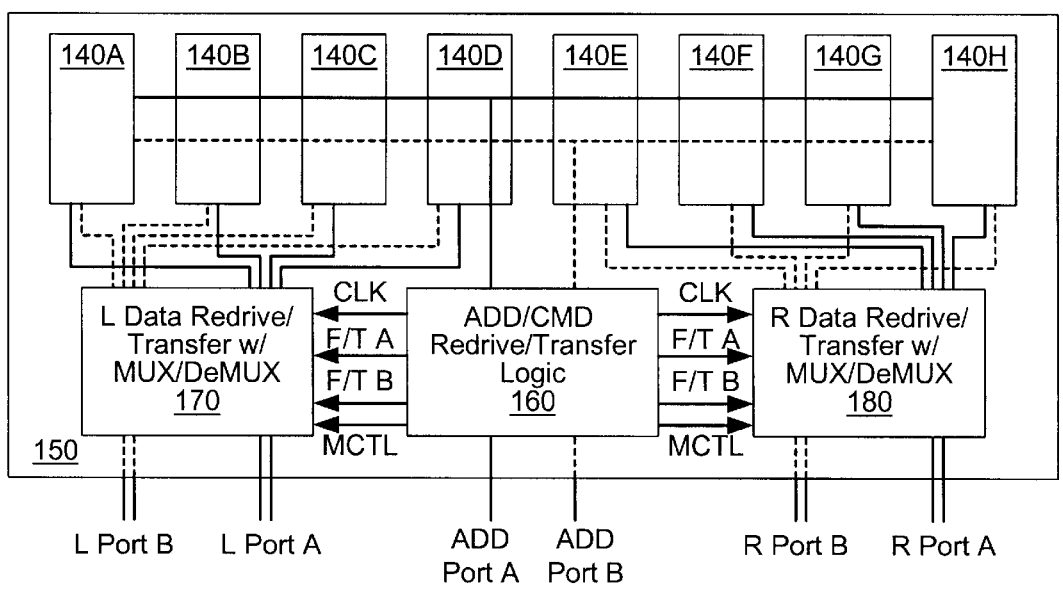

MULTI-TIER POINT-TO-POINT RING MEMORY INTERFACE

FIELD OF THE INVENTION

This present invention relates generally to digital memory devices and systems, and more particularly to bus architectures and bus communication methods for such devices and systems.

BACKGROUND OF THE INVENTION

Microprocessors, digital signal processors, video devices, and many other types of digital data processing devices rely on an attached high-speed memory system to hold data and/or processor instructions needed by the processing device. As these processing devices become faster and more powerful, the increased demands placed on them generally translates to a need for larger and faster attached memory systems.

FIG. 1 depicts a typical memory system configuration. One or more memory devices 26A, 26B, 26C interface with a memory controller 20 through memory bus 22. A host (e.g., a central processing unit (CPU), not shown) also connects to memory controller 20 through a front-side bus FSB. The memory devices hold data in arrays of addressable memory cells. Memory controller 20 controls the exchange of data between the host and the memory storage devices.

Memory bus 22 carries memory signals on a collection of signal lines. Memory signals fall generally into one of several categories including clock and control signals, address signals, command signals, and data signals. Data signals carry the actual data that will be stored in, or retrieved from, a memory device. Address signals specify the location within a memory device where data is to be read from or written to, and may also select which of several memory devices is to be accessed. Command signals instruct a memory device as to what type of operation is to be performed, e.g., read, write, refresh, and possibly as to which of several access modes (such as a burst mode) should be used for a data transfer. Clock and control signals synchronize the other signals passing between controller 20 and the memory devices. Although memory bus 22 may use a separate signal line for each memory signal (e.g., 32 address lines to transfer a 32-bit-wide address in one clock cycle and 32 data lines to transfer a 32-bit-wide data word in one clock cycle), various schemes also exist to reuse one or more signal lines for different memory signals during different clock cycles of a memory transaction.

In the configuration shown in FIG. 1, memory bus 22 is a multi-drop memory bus. In other words, bus 22 is arranged with a backbone of signal lines. A signal line stub, or "drop", connects each of memory devices 26A, 26B, 26C to the backbone. Typically, memory bus 22 will comprise a collection of leads routed on a printed circuit board 21 known as the "main board" or "motherboard". Memory controller 20 mounts to motherboard 21 and connects to one end of the leads comprising memory bus 22. Each drop of memory bus 22 connects to an electrical terminator, or socket. A typical main board contains multiple memory sockets, e.g., the three sockets 28A, 28B, and 28C shown in FIG. 1.

Memory is added to the memory system by inserting memory modules (e.g., 24A, 24B, 24C) into one or more of the sockets. One popular type of memory module is a Dual In-line Memory Module, or DIMM. The DIMM is a rectangular low-profile circuit board that has electrical contact points arranged on both sides along one long edge. The contact points form electrical connections to the main board's memory bus when the DIMM is inserted into a DIMM memory socket.

A DIMM generally has multiple individual memory devices mounted to it. The devices all work in parallel to perform memory functions. For instance, a DIMM may have eight memory devices, each of which receives the same memory address from the controller. If the size of a data word is 32 bits, each of the memory devices is responsible for four bits of the data word that is placed on the memory bus.

BRIEF DESCRIPTION OF THE DRAWING

The invention may be best understood by reading the disclosure with reference to the drawing, wherein:

FIGS. 13A and 13B show a dual-tier ring bus memory module from two views;

FIG. 14 shows a side view of a dual-tier ring bus memory module that uses different bus widths for the two rings.

DETAILED DESCRIPTION OF THE EMBODIMENTS

It is recognized herein that the multi-drop memory bus architecture has several characteristics that limit its expansion to greater numbers of memory devices and/or faster bus speeds. First, the stubbed bus architecture can create undesirable reflections on the signal lines at high frequency. Overall bus length can also cause timing problems that limit operational frequency, as at high frequency a significant skew will be observed between when a memory signal arrives at a closer device vs. when that signal arrives at a device further down the bus. The length of the bus and the number of device inputs also determine the capacitance that a memory device (or the controller) sees when it drives the bus—at higher frequencies, this capacitance may make it infeasible to drive signals reliably on the bus.

Figure 1:
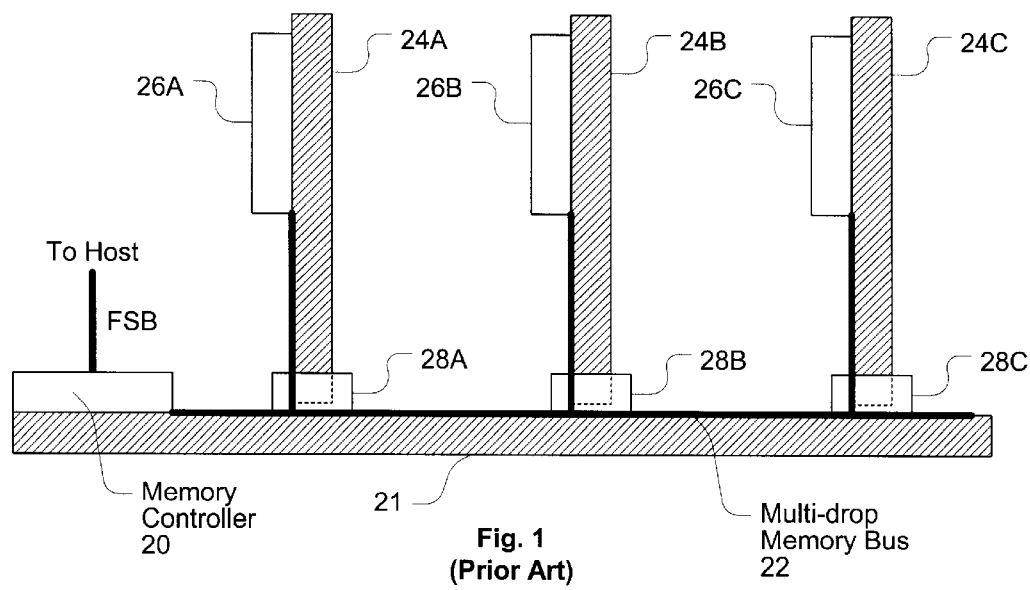
FIG. 1 illustrates a prior art memory system.
Figure 2:
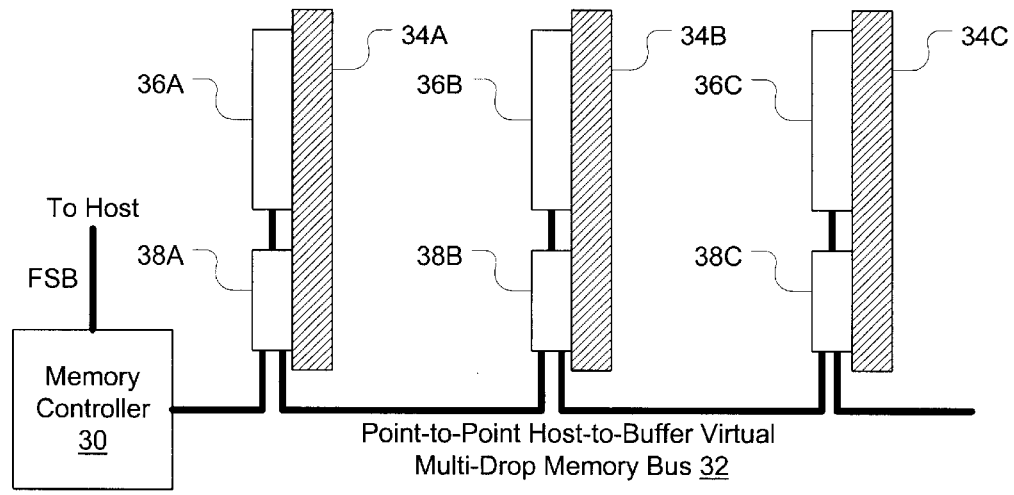
FIG. 2 illustrates a memory system using a point-to-point memory bus architecture.

To combat these problems, a new memory bus architecture and memory module design have been proposed. Referring to FIG. 2, memory bus communications in this architecture pass along point-to-point connections between a memory controller 30 and buffer circuits (e.g., 38A). For instance, when memory controller 30 wishes to send memory signals to device 36C on module 34C, it sends those signals along a first segment of memory bus 32 to buffer 38A on module 34A. Buffer 38A redrives the memory signals to buffer 38B along a physically separate segment of memory bus 32, which redrives the signals in turn to buffer 38C along a third physically separate segment of memory bus 32. Buffer 38C transfers the signals to memory device 36C.

The bus architecture of FIG. 2 solves problems of the prior art. The relatively short, point-to-point bus segments greatly simplify impedance matching and bus timing issues. The capacitance seen by a bus driver can also be significantly reduced—on a given segment of bus 32, only one buffer's input needs to be driven. And each memory device only sees the buffer input on its own module, no matter how many modules exist in the memory system.

The concepts presented herein are generally applicable to the buffered module concept of FIG. 2, although, as will be seen, these concepts are useful in other configurations as well. Generally, some of the disclosed embodiments address two issues with the architecture of FIG. 2.

The first issue is bus width; from an examination of FIG. 2, it can be appreciated that buffer 38A connects to three full-width buses, one to memory controller 30, another to buffer 38B, and a third to memory device 36A. In contrast, some of the disclosed embodiments allow reductions to two full-width buses while maintaining a point-to-point bus configuration. Furthermore, with some embodiments it becomes possible to place multiple banks of memory devices on a module while maintaining this two-bus-width configuration. This advantage can significantly reduce the number of pins on the buffer and on the module card-edge connector, as well as easing routing layout on a module having multiple banks of memory.

The second issue is bus length; although in theory, the architecture of FIG. 2 can be extended to support any number of daisy-chained memory modules, signal propagation latency increases for each added module, this latency being proportional to N, where N is the number of modules. In contrast, the present disclosure includes embodiments with a latency proportional to the log of N, where N is the number of modules (or banks of memory).

Figure 3:
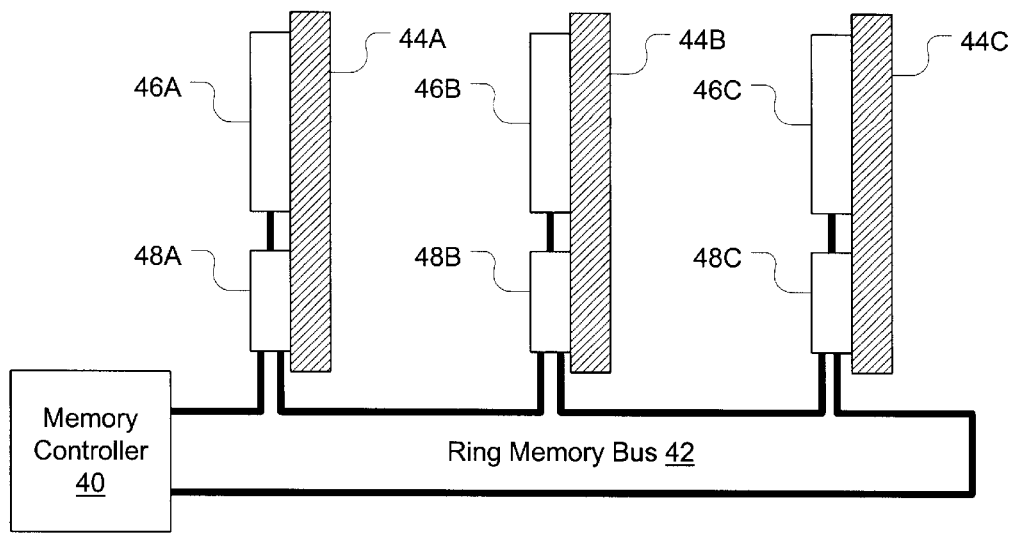
FIG. 3 illustrates a memory system using a point-to-point ring memory bus architecture.

By way of introduction, FIG. 3 illustrates one embodiment of the present invention. Although similar to FIG. 2, memory bus 42 differs from memory bus 32 of FIG. 2 in at least one significant aspect. After passing through the last buffer 48C, memory bus 42 loops back to a memory controller 40 to form a ring bus architecture. When buffers 48A, 48B, and 48C are enabled to intelligently pass signals bi-directionally, ring memory bus 42 can make effective use of both ring bus ports on an addressed buffer. For instance, memory controller 40 can send a data word to module 44B by sending half the word through buffer 48A, and the other half of the word through buffer 48C. When the two halves arrive at the ring bus ports of buffer 48B, buffer 48B can recombine them and transfer the data word to memory device 46B. Since only half of the data word passes in each direction, only half as many data signaling lines are needed as are needed in FIG. 2 for the same transfer rate.

The ring bus operates similarly for a read access. When a data word is read from memory device 46B, buffer 48B splits the word. Buffer 48B sends half of the data word to memory controller 40 by way of buffer 48A, and the other half of the data word to memory controller 40 by way of buffer 48C.

Several terms have been assigned particular meanings within the context of this disclosure. As used herein, a ring bus is a bus where each bus node maintains a point-to-point bus connection with a neighbor node on each side—the "first" and "last" nodes on the ring bus also maintain a bus connection between themselves. A memory unit comprises the memory accessible at one node of a ring bus; if this node lies on a lower-level ring bus of a multi-ring hierarchy, the memory unit can also be considered a memory subunit. A controller occupies a terminating position on a ring bus, i.e., ring bus signals propagate towards or away from the controller on the ring bus. The terms clockwise and counter-clockwise are used in the following description to distinguish the two directions of propagation on a ring bus; these terms are not meant to assign any criticality to any given signal passing in any given direction or to infer that the bus need be configured in any sort of a physically circular fashion. A bank of memory devices is a collection of one or more devices that store data for a particular partition of host-addressable memory space.

Referring once again to FIG. 3, several possible ring memory bus implementations are possible. In one implementation, both the device addressing function and the data signaling function utilize the ring bus. Alternately, the addressing function can use buffered multi-drop or the point-to-point buffered configuration of FIG. 2, with data signaling occurring on the ring bus. Although in an optimal configuration half of the data would be sent along the bus in each direction, other divisions are also possible. While these alternate configurations are acknowledged, the following description will focus on a ring bus for both address and data signaling, where for a given memory transaction, approximately half of the data signals and approximately half of the address signals propagate in each direction along the bus.

Figure 4:
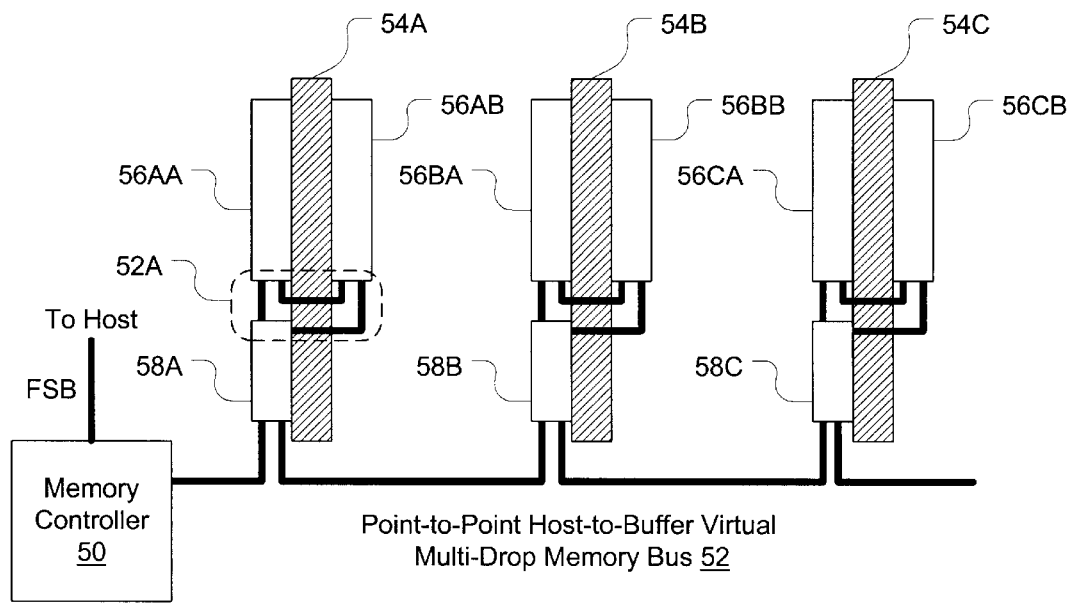
FIG. 4 illustrates a memory system using a local ring memory bus architecture on each memory module.

FIG. 4 shows an alternate configuration that can improve latency and double the capacity of a module. Like FIG. 2, the modules of FIG. 4 connect to a point-to-point full-width host-to-buffer memory bus 52. But each module comprises two individually-addressable banks of memory devices (e.g., banks 56AA and 56AB on module 54A). Buffer 58A and banks 56AA and 56AB connect in a ring memory bus 52A that is local to module 54A. That is, buffer 58A functions as a controller of ring bus 52A. Half of the memory signals for a given transaction pass clockwise along bus 52A, and the other half pass counterclockwise. The non-addressed bank passes the signals along the bus. The maximum path length of FIG. 4 is five bus segments, versus six bus segments for the configuration of FIG. 2 (i.e., expanded with six modules to equal the memory capacity of FIG. 4).

Figure 5:
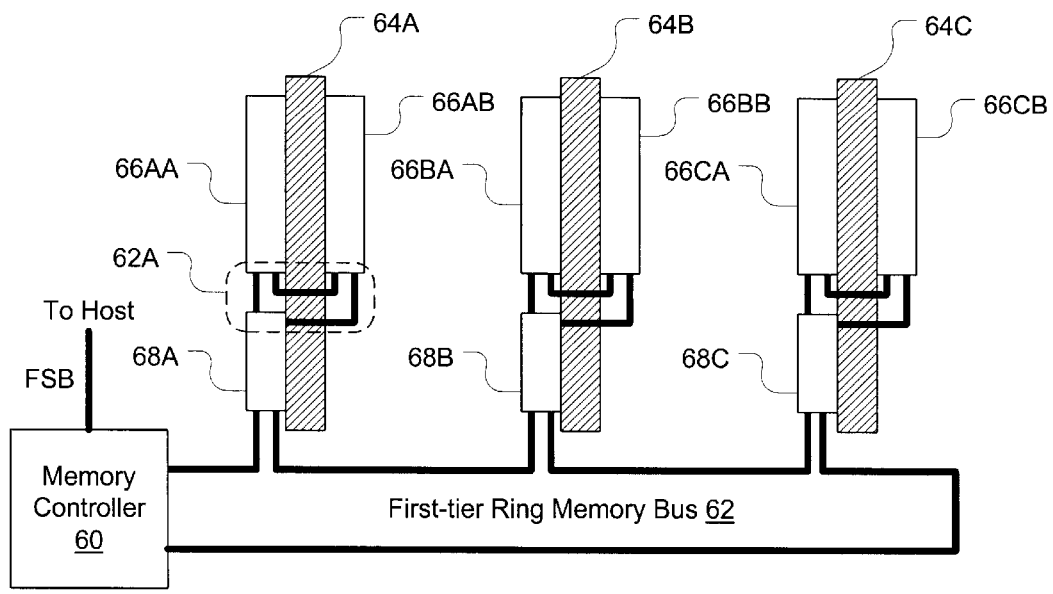
FIG. 5 illustrates a multi-tier ring bus memory system using a point-to-point ring memory bus between memory modules and a local ring memory bus architecture on each memory module.

FIG. 5 illustrates another configuration that combines the ring bus concepts of FIGS. 3 and 4. A first ring bus links a memory controller 60 and memory modules 64A, 64B, and 64C. A second ring bus located on each module (e.g., ring bus 62A on module 64A) connects to two banks of memory devices. Buffer 68A serves as a second-tier controller for ring bus 62A, while also allowing module 64A to appear as a single memory unit on ring bus 62. Although in the specific configuration of FIG. 5 no further latency improvement over FIG. 4 is observed, pin count reductions are possible on both tiers of ring buses.

A memory transaction on the architecture of FIG. 5 can proceed as follows. Controller 60 is directed to access a memory address that is physically located on bank 66BB. Half of the memory signals pass through 68A, 68B, and 68BA. The other half of the memory signals pass through 68C and 68B.

Two issues that arise with the ring bus (single or multi-tiered) are timing and addressing. At least one device in the bus path will account for potential timing differences between the two halves of a set of memory signals. And each non-controller node on a ring bus will receive some type of forwarding information in order to know whether to forward memory signals for a given transaction along the bus or to capture those signals because they relate to a memory unit within that node's addressable space.

The timing issue will be explored in further detail, but may be handled in several ways. First, the controller of each ring bus can be responsible for adjusting the relative timing of the two halves of a transmission. Second, the memory units of each ring bus can be responsible for adjusting the relative timing of the two halves of a transmission. These retiming responsibilities can also be handled by one unit in each multi-tier ring bus path, whether that unit be a signal source, a signal destination, or an intermediate transfer node.

Forwarding information is preferably gleaned from the address bits of a transaction (e.g., the bank selection bits). In some embodiments, this may require that the bank selection bits be duplicated and transmitted on the bus in both directions. This duplication should not, in most cases, result in an appreciable increase in bus width-thirty-two banks of memory can be addressed with only five forwarding bits.

Figure 6:
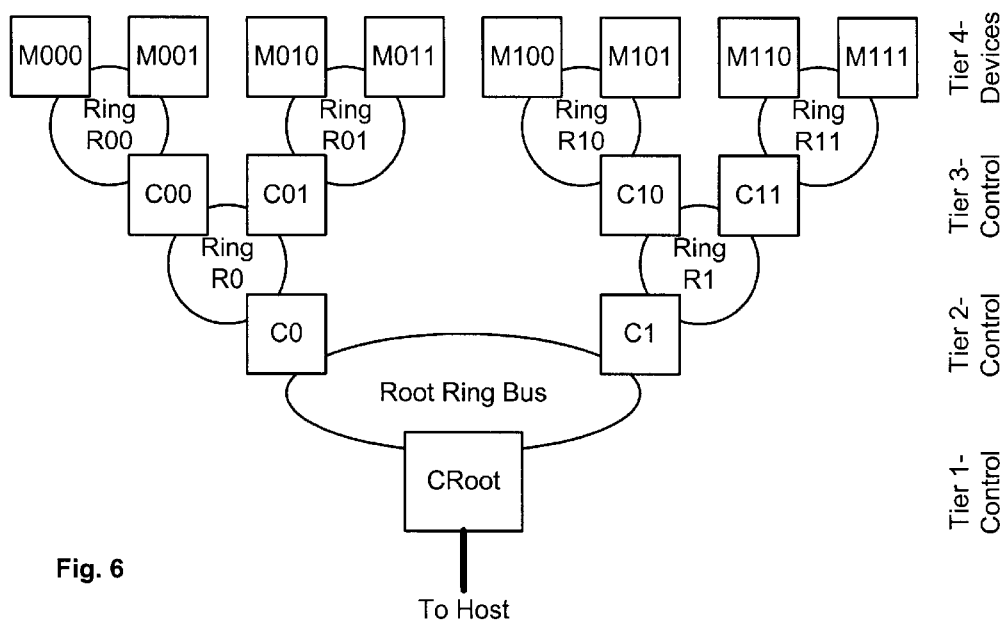
FIG. 6 demonstrates how multiple memory devices can be arranged in a hierarchical binary tree of ring buses.

The multi-tiered ring bus structure can be expanded past two levels. FIG. 6 depicts one expanded structure that resembles a binary tree. The host connects to a primary memory controller CRoot, which occupies a first tier in the ring bus hierarchy. Two second-tier controllers C0 and C1 connect with CRoot through a root ring bus. Each second-tier controller connects to two third-tier controllers through a second-level ring bus (e.g., second-tier controller C0 connects to third-tier controllers C00 and C11 through ring bus R0). Although other intermediate levels of controllers could be included, in FIG. 6 the fourth tier comprises the leaf nodes, e.g., the memory banks. Each third-tier controller connects to two memory banks through a third-level ring bus (e.g., third-tier controller C00 connects to memory banks M000 and M001 through ring bus R00).

The binary ring bus architecture has several desirable attributes. First, each non-controller node on a ring need examine only one forwarding bit in order to decide whether to keep a given bus transmission or forward it to the next node on the ring. This bit can be equated to a binary memory-addressing bit.

A second attribute is that the maximum number of bus segments that must be traversed by a memory signal is directly related to the bus depth, and therefore logarithmically-related to the number of memory banks addressable by the architecture. N memory banks require a maximum bus segment path P, where $$P=2\times\lceil \log_2 N \rceil.$$

A third attribute is that a simple method for determining the path differential to a leaf node (or any intermediate node) exists for the binary ring bus architecture. The clockwise and counterclockwise paths to or from a leaf node include a minimum number of bus segments equal to the tree depth (three rings in FIG. 6). To this, a clockwise path (to the node) includes an additional number of bus segments equal to the number of 1's in the forwarding address to the node. Likewise, the counterclockwise path (to the node) includes an additional number of bus segments equal to the number of 0's in the forwarding address to the node. The differential path length to a node is thus the difference between the number of 0's in the forwarding address and the number of 1's in the forwarding address. These straightforward rules can be used to register signal halves, predict when the second half of a signal will arrive at a given node, etc.

Figure 7:
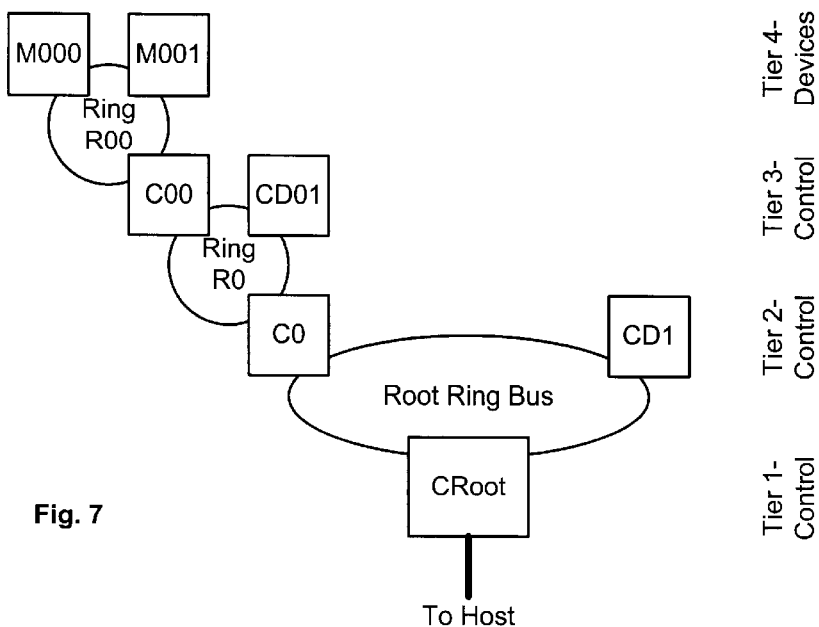
FIG. 7 demonstrates how the arrangement of FIG. 6 can be truncated using continuity devices.

A fourth attribute is the ability to construct a partial full-tree bus with a minimum number of continuity devices. For example, FIG. 7 shows the architecture of FIG. 6, but with only two memory banks M000 and M001 actually present. A first continuity device CD1 completes the root ring bus, and a second continuity device CD01 completes ring R0.

Figure 8:
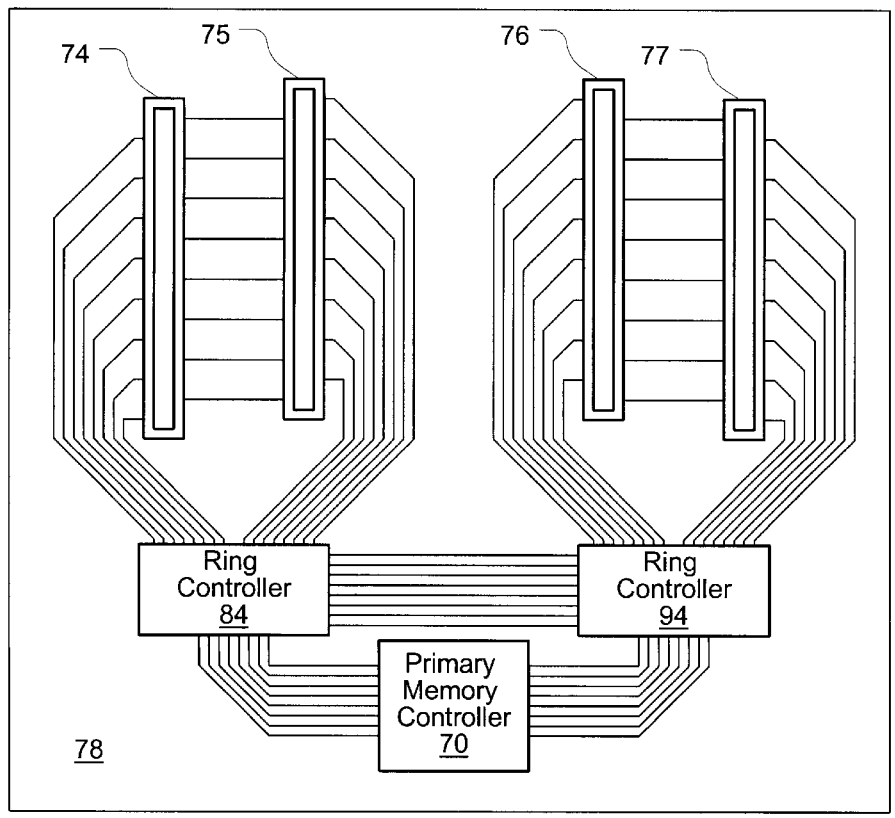
FIG. 8 shows an exemplary board layout for connecting up to four memory modules in a dual-ring-bus configuration.

Note that a lower-tier controller can function as a continuity device. For instance, FIG. 8 shows a high-level layout for a main board having four slots 74–77 for accommodating up to four memory modules. Second-tier controllers 84 and 94 can each function as a continuity device if their slots remain unfilled. If one of the two slots connected to a second-tier controller has no memory module, a continuity module can be placed in that slot. It is noted that it is also possible to collapse the second-tier controllers into a common integrated circuit package with primary memory controller 70, if it is feasible to connect four half-buses of memory bus pins to controller 70. An advantage of such a structure is that the clocking delays of the second-tier controllers can be avoided.

Figure 9:
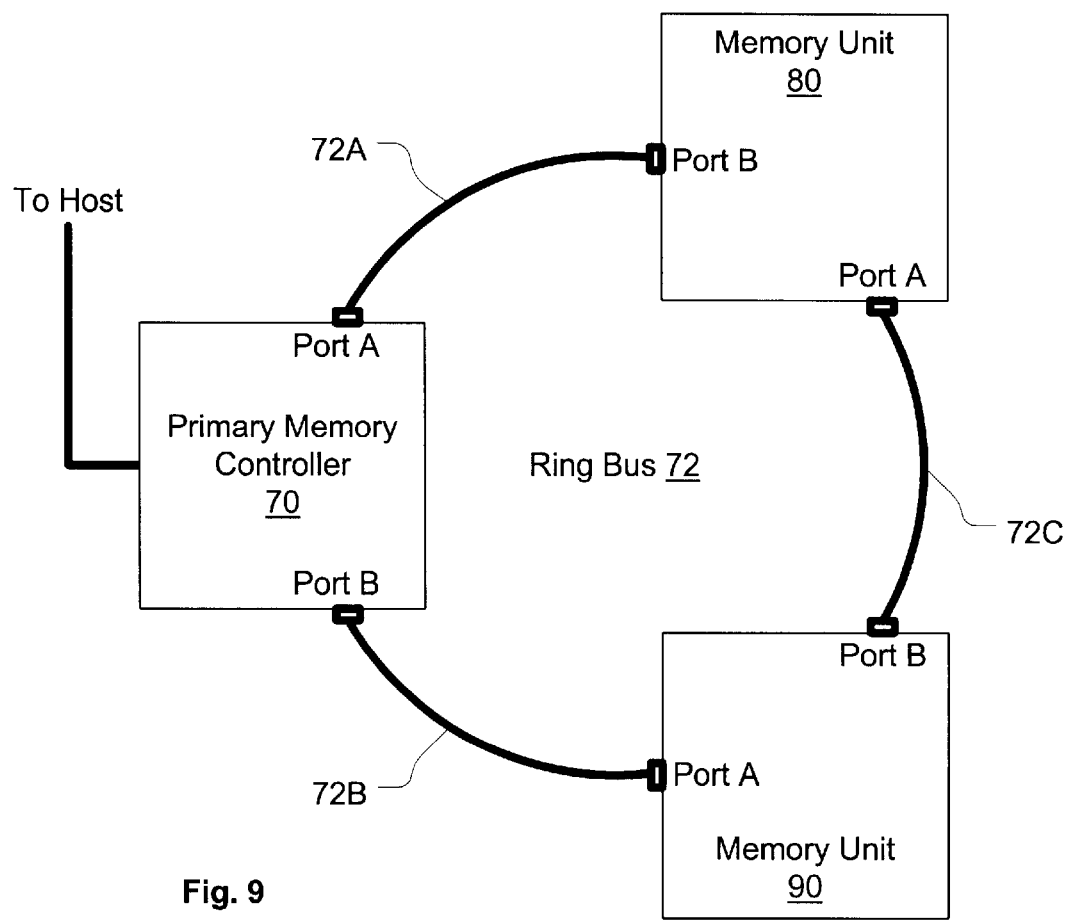
FIG. 9 depicts a ring memory bus memory system using one group of terminology.
Figure 10:
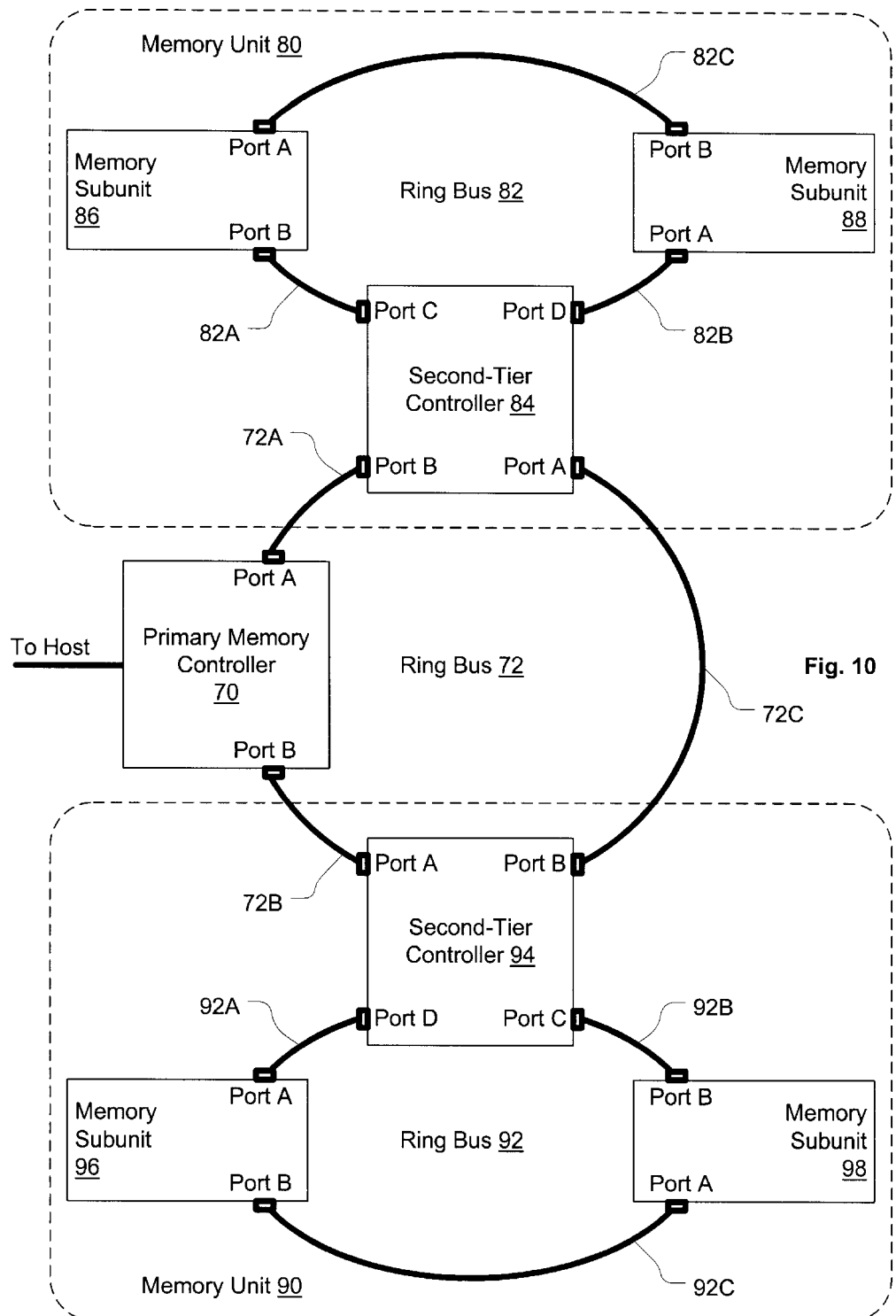
FIG. 10 depicts the memory system of FIG. 9 expanded to two tiers.

FIGS. 9 and 10 illustrate one ring-bus node-connection model useful with the present invention. FIG. 9 shows a primary memory controller 70 with two ports A and B. Primary memory controller 70 shares a ring bus with memory units 80 and 90, each of which also has an A port and a B port. To complete the ring, primary memory controller 70 port A connects to memory unit 80 port B, memory unit 80 port A connects to memory unit 90 port B, and memory unit 90 port A connects to primary memory controller 70 port B. The memory units can be virtually identical, the only difference being that each one has a unique forwarding address.

If the memory units have ring-bus subunits, FIG. 10 shows one possible ring-bus node-connection model for this configuration. In this configuration, the primary memory controller 70 can be considered a first-tier controller as it controls the first-tier ring bus. Bus ports on the first-tier ring bus are level-one ports, and bus ports on the second-tier ring buses are level-two ports. Considering memory unit 80, a second-tier controller 84 incorporates the level-one ports A and B of that memory unit to first-tier ring bus 72. Second-tier controller 84 is capable of transferring memory signals between its level-one ports A and B (in redrive mode). Redrive mode is used when second-tier controller 84 receives a memory signal (on bus segment 72A or bus segment 72C) that is not destined for memory unit 80.

Second-tier controller 84 also has two level-two ports C and D to connect to a second-level ring bus 82. Controller 84 operates in a transfer mode when a signal is to be transferred from its memory subunits to primary memory controller 70. In transfer mode, memory signals pass between level-one port A and level-two port D of second-tier controller 84, and/or between level-one port B and level-two port C.

Figure 11:
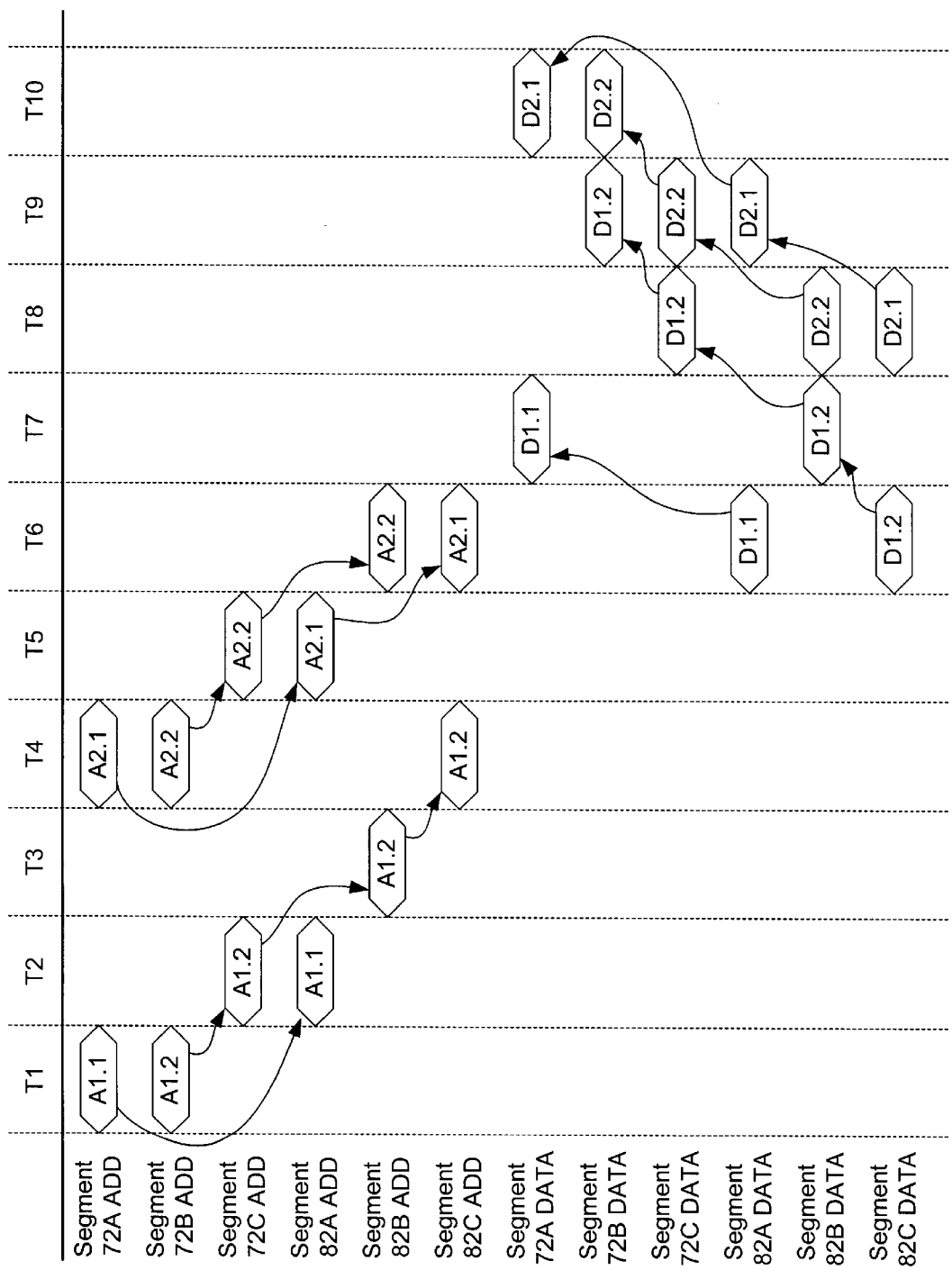
FIGS. 11 and 12 contain timing diagrams for operating the memory system of FIG. 10.
Figure 12:
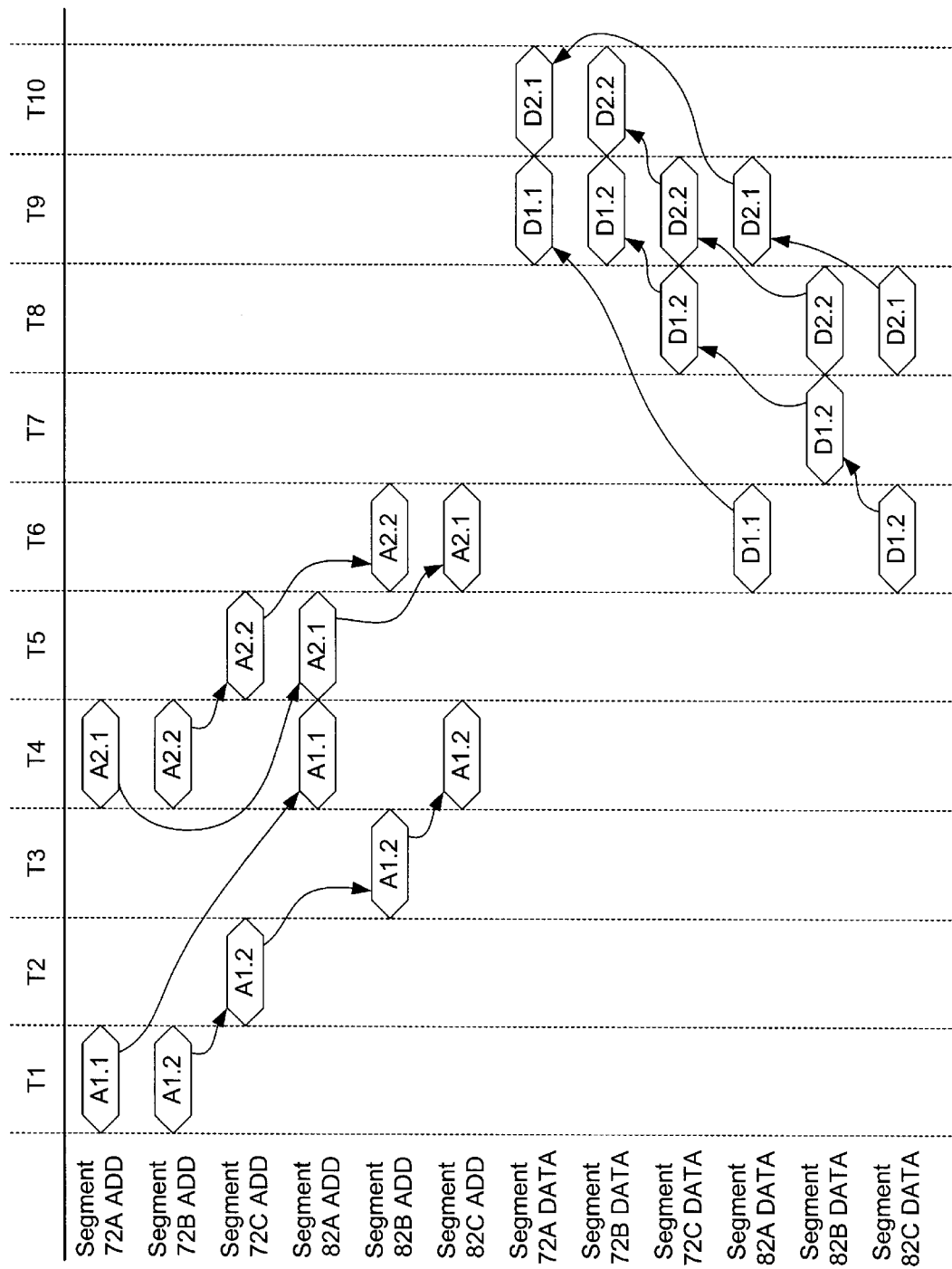

FIGS. 11 and 12 show exemplary timing diagrams for two possible methods of implementing a read operation, illustrating how address and data signals generally move along the two-tiered ring bus architecture of FIG. 10. Although the address signals are shown as happening during a single bus time, those skilled in the art recognize that each particular type of memory device may have particular addressing sequences wherein some address signals occupy one bus time and other address signals occupy different, but time-related bus times. The notation Ax.y refers to an address x, address segment y. Likewise, the notation Dx.z refers to the data read from address x, data segment z.

FIG. 11 shows a read operation to memory subunit 86, followed by a read operation to memory subunit 88. Primary memory controller 70 initiates a read to address A1 (on subunit 86) at T1 by placing address segment A1.1 on memory bus segment 72A and its corresponding address segment A1.2 on memory bus segment 72B. Address segment A1.1 arrives at second-tier controller 84 port B; controller 84 reads the high-order forwarding bit attached to that address segment and determines that it should keep it. Thus at T2, second-tier controller 84 transfers A1.1 out its port C onto bus segment 82A on second-tier ring bus 82. Note that controller 84 may strip the high-order forwarding bit from A1.1 when transferring it to ring bus 82.

Also at T1, A1.2 arrives at second-tier controller 94 port A; second-tier controller 94 reads the high-order forwarding bit attached to that address segment and determines that it should forward it. Thus at T2, second-tier controller 94 redrives A1.2 out its port B onto bus segment 72C. A1.2 next arrives at second-tier controller 84 port A; controller 84 reads the high-order forwarding bit attached to that address segment and determines that it should keep it. Thus at T3, second-tier controller 84 transfers A1.2 out its port D onto bus segment 82B on second tier bus 82. Note that controller 84 may strip the high-order forwarding bit from A1.2 when transferring it to ring bus 82.

Also at T2, A1.1 arrives at memory subunit 86 port B; subunit 86 reads the next-to-highest-order forwarding bit and determines that it should keep it. Memory subunit 86 knows from its forwarding address that it can expect the remainder of the address (A1.2) two memory cycles later at T4. Thus, it can store A1.1 until A1.2 arrives. Alternately, if it can begin the memory cycle before A1.2 arrives (if, for instance, A1.1 contains the row address and A1.2 contains the column address), it may begin to process read operation A1.

At T3, A1.2 arrives at memory subunit 88 port A; subunit 88 reads the next-to-highest-order forwarding bit and determines that it should forward it. Thus at T4, memory subunit 88 redrives A1.2 out its port B onto bus segment 82C. A1.2 arrives at memory subunit 86 port A; subunit 86 can read the next-to-highest order forwarding bit to determine that it should keep it; alternately, A1.2 can be automatically kept-subunit 86 knows that it should receive at T4 the companion to A1.1 on its port A, based on its timing from A1.1.

Memory subunit 88 reads the data at address A1 (this is shown as taking two cycles; the actual number of cycles required is device-dependent). At T6, data D1 is ready to be sent back to primary memory controller 70. Subunit 88 drives one-half of the data D1.1 out its port B onto bus segment 82A; subunit 88 drives the other half of the data D1.2 out its port A onto bus segment 82C. Subunit 86 also signals subunit 88 to redrive D1.2.

Data segments D1.1 and D1.2 generally retrace the paths taken by address segments A1.1 and A1.2 back to primary memory controller 70. D1.1 arrives at controller 70 port A at T7; D1.2 arrives at controller 70 port B at T9. Controller 70 knows when to expect these data segments based on the forwarding address that was originally supplied with the address segments.

The read to address A2 presents a timing issue, as this address lies on a different subunit (subunit 88) than A1 lies on. In this instance, if address segments A2.1 and A2.2 were issued immediately after A1.1 and A1.2, A1.2 and A2.1 would collide on memory bus segment 82C (as would D1.2 and D2.1 on bus segment 82B). But since primary memory controller 70 can know the latency for each address segment (and corresponding data segment), it can delay issuing A2 until T4 to prevent a collision. Note that in this instance, D1.2 arrives at primary memory controller 70 at T9, and D2.1 and D2.2 arrive at T10, only one cycle later. This will not always be the case, as a read to a longer-latency path subunit can cause the data bus to be empty for one or more cycles.

Write commands operate similarly to read commands, except that data signals pass in the same direction as address signals on each bus segment. Note that a read-to-write turnaround must also ensure that the data bus is clear from the last read before write data is placed on the bus.

FIG. 12 illustrates the same two read operations under a slightly different method of operation. Here, instead of having the primary memory controller and the memory subunits retime address and data segments that arrive at different time, all retiming is accomplished in the second-tier controller that transfers the segments between ring buses 72 and 82. At T1, primary memory controller 70 initiates a read to address A1, just like it did in FIG. 11. But when A1. arrives at second-tier controller 84, second-tier controller 84 knows that if it transfers A1.1 immediately, it will arrive at memory subunit 86 two clock cycles ahead of A1.2. Thus second-tier controller 84 holds A1.1 for two clock cycles, allowing itself time to receive A1.2 at T2 and retransmit A1.2 at T3. Finally, at T4, second-tier controller 84 retransmits A1.1. Both A1.1 and A1.2 arrive during the same clock cycle at memory subunit 86.

On the return data path, second-tier controller 84 once again performs a hold, this time of D1.1 during clock cycles T7 and T8. This hold allows D1.1 and D1.2 to both arrive at controller 70 at T9. Note that in this scheme, since several data or address segments may arrive at a given port in consecutive clock cycles, second-tier controller 84 may require a multi-stage buffer to perform the hold function. Also note that the read to address A2 requires no retiming, since the path lengths are identical for the two paths.

FIGS. 13A and 13B show, respectively, top-edge and side views of a memory module 100 according to an embodiment of the invention. A bank of eight memory devices, labeled 140A to 140H, populates the upper portion of one side of module 100. A second corresponding bank (beginning with device 142A) populates the other side of module 100. The first side contains three other devices: ADD/CMD (Address/Command) Redrive/Transfer Logic 110; L (Left) Data Redrive/Transfer 120; and R (Right) Data Redrive/Transfer 130. Together, these three devices function as a module controller. The controller functions performed by these devices are partitioned into three circuits for routing and pinout convenience—a lesser or greater number of devices can be designed to perform the same function. Left and right redrive/transfer devices 120 and 130 perform the same functions at the same time, just on different groups of data lines.

Also shown in FIGS. 13A and 13B are address/command and data lines. The external address and command lines are shown as two single lines, one connecting logic 110 to ADD Port A and the other connecting logic 110 to ADD Port B (a dashed line represents a signal routed on the opposite side of the module—this is not necessary, but is one preferred method of routing). Each single-address-line depiction in FIG. 13B will typically represent multiple address and command signal lines, the number depending on device type, addressable memory size, etc. Four sets of four external data bus lines each are also shown, the sets connected respectively to L data redrive/transfer 120 ports B and A, and R data redrive/transfer 130 ports B and A. Together, these four sets form a sixteen-bit-wide data bus in the preferred ring bus implementation. This bus width is exemplary, as any other bus width can also be selected.

Externally, memory module 100 forms a node in a higher-level ring bus. Internally, devices 110, 120, and 130 together form a ring bus controller for a lower-level local ring bus including the controller and the two banks of memory devices. Address and data signals arriving at port A can be redriven out port B (and vice-versa) on the higher-level bus. These signals can also be transferred to the local ring bus. According to the layout of FIG. 13B, port A signals can be transferred to the memory devices on the facing side of module 100, and port B signals can be transferred to the memory devices on the hidden side of module 100. The memory devices on the two sides of the module also connect through the substrate (see FIG. 13A), completing the local ring bus.

Logic 110 controls bus redrive and bus transfer functions for itself and for devices 120 and 130. Logic 110 provides a clock signal CLK to devices 120 and 130 to synchronize data operations. Logic 110 provides two other signals, F/T (forward/transfer) A and F/T B to control the data paths through devices 120 and 130.

FIG. 14 illustrates an alternate memory module configuration 150. In this configuration, the left and right data redrive/transfer devices 170 and 180 also provide a MUX/DeMUX (Multiplexer/Demultiplexer) function. This function allows the external ring bus and the local ring bus to operate at different speeds and with different data widths. For instance, device 150 is shown with eight external data lines and 16 internal data lines. When the external ring bus can operate at twice the frequency of the memory devices, this configuration allows the external ring bus to transfer data at the full speed of the devices with less data lines, further reducing pin count on the bus devices and the module cards.

Figure 15:
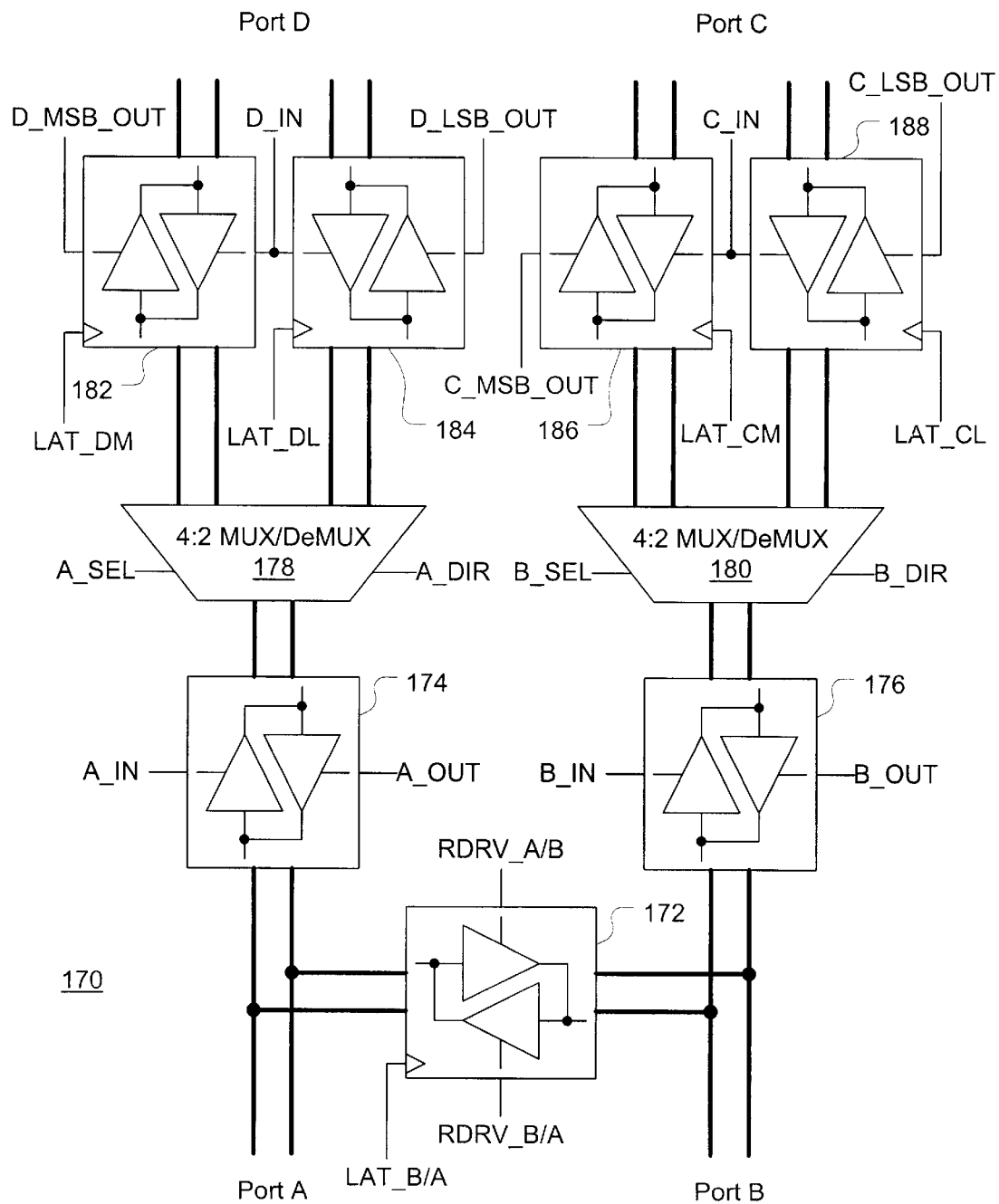
FIG. 15 shows a block diagram for a data redrive/transfer circuit useful with the module of FIG. 14.

FIG. 15 details one possible configuration for a redrive/transfer device 170 useful with module 150. Device 170 comprises seven bidirectional two-bit buffer circuits and two 4:2 MUX/DeMUX units. One buffer circuit 172 connects between port A and port C (serving the external ring bus). When RDRV_A/B is enabled, circuit 172 redrives data signals from port A to port B. When RDRV_B/A is enabled, circuit 172 redrives data signals in the opposite direction. Buffer circuit 172 includes a latching function, controlled by LAT_B/A, that can be used to retime signals passing between ports A and B.

Two other buffer circuits 174 and 176 transfer data signals, respectively, between ports A and B and MUX/DeMUX units 178 and 180. When one of circuits 174 and 176 has its OUT signal enabled, that circuit transfers data from the MUX output to its external port. When one of the circuits has its IN signal enabled, the circuit transfers data from its external port to the deMUX input.

MUX/DeMUX units 178 and 180 are also bidirectional. Considering unit 178, A_SEL determines which of buffers 182 and 184 is currently coupled with buffer 174 through unit 178. When A_DIR is set in one state, data flows towards buffer 174; conversely, when A_DIR is set in the opposite state, data flows away from buffer 174.

Buffer circuits 182 and 184 function as a pair for data transfers IN on port D, e.g., data is received from the memory devices as four bits in parallel. For data transfers OUT on port D, first one-half of the bits are latched (e.g., the most-significant bits can be latched first into buffer 182 using D_MSB_OUT) from DeMUX 178; when the second half of the bits arrive, they can then be latched into the other buffer circuit. The latching signals LAT_DM and LAT_DL can operate in unison to latch data from the memory devices; the latching signals operate sequentially to latch data received on port A.

It is noted that the redrive/transfer circuits of FIGS. 13A/B, 14, and 15 can have other functions besides data redrive/transfer and multiplexing/demultiplexing. For instance, the circuits can incorporate multistage hold buffers that can be used to retime two halves of a ring bus transmission. The circuits can also provide clock synchronization between the A and B ports and/or between the two buses. Preferably, the circuits will provide capacitive isolation between the external and local buses. Where the memory devices require different signaling voltages than those used by the motherboard circuitry, the transfer circuits can also provide voltage translation.

The types, sizes, or numbers of memory devices selected for use with the present invention are not critical. Some possible device types include dynamic random access memory (DRAM) devices, synchronous DRAM (SDRAM) devices including double-data-rate (DDR) SDRAM devices, quad-data-rate (QDR) SDRAM devices, Rambus™ DRAM devices (with an appropriate controller), static RAM and flash memory devices. It may be possible to combine memory modules in a memory system according to the invention where two modules incorporate different types of memory devices. Where two or more memory devices are physically connected in a ring architecture, the ring buffer circuitry can be incorporated onto the memory devices themselves or placed on a separate interface circuit.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. For instance, a row address may always be sent over the shortest of two paths (and the column address in the other) in order that it arrives at a memory unit in the shortest possible time. Two banks of memory on a module could also not be arranged in a lower-tier ring bus, but connected instead to the module's controller through separate point-to-point buses. Such minor modifications are encompassed within the invention, and are intended to fall within the scope of the claims. The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A memory system comprising:
    a first-tier controller having first and second level-one ports; and
    multiple memory units, each having first and second level-one ports, connected with the first-tier controller in a first ring bus, each of the memory units and the first-tier controller capable of transmitting memory signals in a clockwise direction on the first ring bus using the corresponding first level-one port, and in a counterclockwise direction on the first ring bus using the corresponding second level-one port, and wherein each memory unit is capable of retransmitting memory signals received by that unit at one level-one port on the other level-one port.

2. The memory system of claim 1, wherein each of the memory units comprises:
  a second-tier controller to connect the memory unit to the first ring bus and transfer memory signals between that memory unit and the first ring bus, the second-tier controller having first and second level-two ports; and
  multiple memory subunits, each having first and second level-two ports, connected with the second-tier controller in a second ring bus, wherein each of the memory subunits and the second-tier controller are capable of transmitting memory signals in a clockwise direction on the second ring bus using the corresponding first level-two port, and in a counterclockwise direction on the second ring bus using the corresponding second level-two port, and wherein each memory subunit is capable of retransmitting memory signals received by that subunit at one level-two port on the other level-two port.

3. The memory system of claim 1, wherein the first-tier controller comprises a retiming circuit capable of adjusting relative timing between a signal propagating clockwise on the first ring bus and a signal propagating counterclockwise on the first ring bus in order to register those two signals.

4. The memory system of claim 1, further comprising a continuity device capable of replacing a memory unit on the first ring bus.

5. The memory system of claim 2, wherein each memory unit is a memory module, and wherein each of the memory subunits comprises a bank of memory devices mounted on the module.

6. The memory system of claim 2, wherein the memory signals transmitted on the first and second ring buses comprise data signals.

7. The memory system of claim 2, wherein the second-tier controller comprises a retiming circuit capable of adjusting relative timing between a signal propagating clockwise on the first ring bus and a signal propagating counterclockwise on the first ring bus in order to register those two signals.

8. The memory system of claim 2, wherein the second-tier controller comprises a retiming circuit capable of adjusting relative timing between a signal propagating clockwise on the second ring bus and a signal propagating counterclockwise on the second ring bus in order to register those two signals.

9. The memory system of claim 2, wherein a memory subunit comprises a retiming circuit capable of adjusting relative timing between a signal propagating clockwise on the second ring bus and a signal propagating counterclockwise on the second ring bus in order to register those two signals.

10. The memory system of claim 2, further comprising a continuity device capable of replacing a memory subunit on the second ring bus.

11. The memory system of claim 4, the continuity device having two leve-lone ports, the continuity device capable of retransmitting memory signals received at one level-one port the other level-one port in order to propagate those signals along the first ring bus.

12. The memory system of claim 5, wherein each memory module further comprises a circuit board having a connector to couple the second-tier controller to the first ring bus, the circuit board having two banks of memory devices arranged on opposite sides of the circuit board.

13. The memory system of claim 6, wherein data signals are clocked onto the first ring bus at twice the frequency that data signals are clocked onto the second ring bus, the second-tier controller comprising a data multiplexer/demultiplexer capable of translating data signals between the two buses.

14. The memory system of claim 6, wherein the first-tier and each second-tier controller are capable of communicating a set of data signals between themselves by sending one portion of the set of data signals in a clockwise direction on the second ring bus and sending the remainder of the set of data signals in a counterclockwise direction on the second ring bus.

15. The memory system of claim 6, wherein the memory signals transmitted on the first ring bus further comprise address signals.

16. The memory system of claim 6, wherein the memory signals transmitted on the second ring bus further comprise address signals.

17. The memory system of claim 10, the continuity device having two level-two ports, the continuity device capable of retransmitting memory signals received at one level-two port on the other level-two port in order to propagate those signals along the second ring bus.

18. A memory module comprising:
  at least one bank of memory devices;
  a module controller to communicate memory signals with the bank of memory devices over a memory module bus, the module controller capable of connecting to a primary memory controller along a ring bus, the module controller comprising an interface circuit to transfer memory signals between the memory module bus and the ring bus,
  wherein the module controller is capable of communication with the primary memory controller to send a set of data signals between the two, by sending one portion of the set of data signals in a clockwise direction on the first ring bus and sending the remainder of the set of data signals in a counterclockwise direction on the first ring bus.

19. The memory module of claim 18, having two banks of memory devices, wherein the module controller communicates with each bank of memory devices over a memory module bus shared only with that bank of devices.

20. A memory module comprising:
  at least two banks of memory devices, each bank having first and second level-two ports;
  a module controller, having first and second level-two ports, connected with the memory device banks in a module ring bus, wherein each of the memory device banks and the controller are capable of transmitting memory signals in a clockwise direction on the module ring bus using the corresponding first level-two port, and in a counterclockwise direction on the module ring bus using the corresponding second level-two port, and wherein each memory device bank is capable of retransmitting memory signals received by that bank at one level-two port on the other level-two port.

21. The memory module of claim 20, wherein the module controller further comprises a pair level-one of ports to connect the module to a system memory bus, the module controller comprising an interface circuit to transfer memory signals between the system memory bus and the module ring bus.

22. The memory module of claim 21, wherein the pair of level-one ports comprise a transfer port and a forwarding port, the module controller capable of using the transfer port to transfer memory signals between the interface circuit and a primary memory controller connected to the system memory bus, the module controller capable of using the forwarding port to exchange memory signals with a second memory module.

23. The memory module of claim 21, wherein the pair of level-one ports comprise first and second transfer/forwarding ports, the module controller capable of retransmitting memory signals received at one of the pair of level-one ports on the other level-one port, the module controller also capable of sending one portion of a set of memory signals, received on the first level-two port to the module ring bus, out the first transfer/forwarding port, and sending the remainder of the set of memory signals, received on the second level-two port to the module ring bus, out the second transfer/forwarding port.

24. A method of host/memory communication comprising:

trasmitting a partial set of memory signals over a clockwise bus path between a first-tier controller and a selected one of a plurality of memory units, wherein the first-tier controller and the plurality of memory units are linked by a first ring memory bus, wherein each of the memory units and the controller are capable of transmitting memory signals in a clockwise direction and in a counterclockwise direction on the bus, and wherein each memory unit is capable of retransmitting memory signals received on the bus along the bus; and transmitting the remainder of the set of memory signals over a counterclockwise bus path between the controller and the selected memory unit.

25. The method of claim 24, further comprising retiming at least one of the partial set of memory signals and the remainder of the set of memory signals such that at the signal destination the partial set and the remainder signals are registered in time.

26. The method of claim 24, wherein the set of memory signals comprise a set of data signals, where approximately half of the data signals are transmitted on the clockwise bus path and the remainder of the data signals are transmitted on the counterclockwise bus path.

27. The method of claim 24, wherein the partial set of memory signals and the remainder each comprise a set of forwarding signals, the sender of the memory signals setting the forwarding signals to indicate the destination of the memory signals, each memory unit that receives the forwarding signals decoding the forwarding signals to determine whether to forward or keep the memory signals associated with those forwarding signals.

28. The method of claim 24, where in each memory unit comprises a second-tier controller and multiple memory subunits, wherein the second-tier controller and the memory subunits are linked by a second ring memory bus, where in each of the memory subunits and the second-tier controller are capable of transmitting memory signals in a clockwise direction and in a counterclockwise direction on the second ring memory bus, and wherein each memory subunit is capable of retransmitting memory signals received on the second ring memory bus along that bus, the method further comprising:

when the second-tier controller receives memory signals from one of the memory subunits from a given bus direction on the second ring memory bus, the second-tier controller transferring those memory signals to the first ring memory bus and sending those memory signals to the first-tier controller in a corresponding direction; and when the second-tier controller receives memory signals, from the first-tier controller and in a given bus direction on the first ring memory bus, that are destined for one of the memory subunits, the second-tier controller transferring those memory signals to the second ring memory bus and sending those memory signals to the appropriate memory subunit in a corresponding direction.

29. The method of claim 25, wherein retiming comprises delaying, prior to transmitting, the memory signals on one of the bus paths relative to the other bus path, such that the partial set and the remainder arrive at the signal destination at approximately the same time.

30. The method of claim 25, wherein retiming comprises receiving, at the destination, the first to arrive of the partial set and the remainder, and holding those memory signals until the second to arrive of the partial set and the remainder arrives.

31. The method of claim 25, wherein retiming comprises adjusting the relative timing of the partial set and the remainder at an intermediate point on the bus paths, such that the partial set and the remainder arrive at the signal destination at approximately the same time.

32. The method of claim 26, further comprising, when the first-tier controller transmits data signals to the selected memory unit, the first-tier controller first transmitting addressing signals to notify that memory unit to prepare to keep the data signals when they arrive on the bus, and to notify the other memory units to pass the data signals along the first ring memory bus.

33. The method of claim 28, wherein the first ring bus and the second ring bus have different bus widths, the method further comprising:

when the second-tier controller transfers memory signals from the narrower of the two buses to the wider of the two, that controller holding a first set of memory signals arriving on the narrower bus until a corresponding second set of memory signals arrives on that bus, and then combining the two sets of memory signals for transfer to the wider bus; and when the second-tier controller transfers memory signals from the wider of the two buses to the narrower of the two, that controller dividing the set of memory signals into first and second subsets and placing those subsets separately on the narrower bus.

34. The method of claim 32, further comprising the first-tier controller transmitting the data signals a fixed time period after transmitting the addressing signals, the selected memory unit associating those addressing signals with data signals arriving at that unit the same fixed time period after the addressing signals arrive at that memory unit.

35. A method of connecting multiple memory units in a memory system, the method comprising:

placing a primary memory controller at a root node of a multi-tiered ring bus;

placing each memory unit at a leaf node of the multi-tiered ring bus; and placing a ring-bus transfer controller at each intermediate node of the multi-tiered ring bus, wherein the primary memory controller and each ring-bus transfer controller are capable of communicating a set of data signals between themselves by sending one portion of the set of data signals in a clockwise direction on the first tier of the ring bus and sending the remainder of the set of data signals in a counterclockwise direction on the first tier of the ring bus.

36. The method of claim 35, wherein the multi-tier ring bus is arranged as a binary tree.

* * * * *

UNITED STATES PATENT AND TRADEMARK OFFICE
CERTIFICATE OF CORRECTION

PATENT NO. : 6,658,509 B1
DATED : December 2, 2003
INVENTOR(S) : Bonella et al.

It is certified that error appears in the above-identified patent and that said Letters Patent is hereby corrected as shown below:

Column 11,
Line 53, "two leve-lone ports," should read -- two level-one ports, --.

Signed and Sealed this

Twenty-third Day of November, 2004

JON W. DUDAS
*Director of the United States Patent and Trademark Office*